United States Patent [19]

Koutitonsky

[11] 3,835,208

[45] Sept. 10, 1974

[54] METHOD FOR PRODUCING AN INTEGRAL SKIN PHENOLIC FOAM
[75] Inventor: Serge Iginai Koutitonsky, Montreal, Quebec, Canada
[73] Assignee: Esso Research and Engineering Company, Linden, N.J.
[22] Filed: June 9, 1972
[21] Appl. No.: 261,418

[52] U.S. Cl.................... 264/45, 161/160, 161/161, 264/48, 264/53, 264/338, 264/DIG. 2, 264/DIG. 5, 264/DIG. 14
[51] Int. Cl............................................. B29d 27/04
[58] Field of Search....... 260/2.5 AZ; 161/159, 160, 161/161; 264/54, 48, DIG. 14, DIG. 2, 338, DIG.5

[56] References Cited
UNITED STATES PATENTS

| | | | |
|---|---|---|---|
| 2,693,006 | 11/1954 | Shigekawa | 264/DIG. 14 |
| 2,802,240 | 8/1957 | Thomas | 264/DIG. 14 |
| 2,933,461 | 4/1960 | Mullen | 161/160 X |
| 3,536,575 | 10/1970 | Maitrot | 161/160 X |
| 3,694,530 | 9/1972 | Wolfe | 161/161 X |

OTHER PUBLICATIONS

Knox, R. E., "Molding of Prepolymer Based Resilient Urethane Foam," In Rubber World, February 1959, pp. 685–692.

Benning, Calvin J. "Plastic Foams: The Physics and Chemistry of Product Performance and Process Technology," Vol. 1, New York, Wiley Interscience, c1969, pp. 424–434.

*Primary Examiner*—Philip E. Anderson

[57] ABSTRACT

A phenolic foam element having an integral skin of hard, unfoamed thermoset resin is prepared by foaming and curing a phenol aldehyde resin between mold confining members coated with a surface active agent in an amount sufficient that the resin in contact with the mold during foaming collapses, thereby forming the skin. This integral skin protects the foam against abrasion and indentation and eliminates the need for protective coatings, of paper, and the like, on the foam.

6 Claims, No Drawings

METHOD FOR PRODUCING AN INTEGRAL SKIN PHENOLIC FOAM

BACKGROUND OF THE INVENTION

The present invention relates to an improved insulating board and in particular to an insulating board formed of foamed thermoset phenol aldehyde resins, such as phenol formaldehyde resins. More particularly, the instant invention relates to improved phenolic foam insulating boards having improved mechanical strength.

The insulating properties of foamed plastic materials are well known. Indeed, one of the most frequently cited advantages of foamed thermoset phenol formaldehyde resins is their very low thermal conductivity. Notwithstanding the extremely desirable insulating value of such foamed resins, commercial utilization of such foamed materials in building structures such as walls and roof structures necessitates the preparation of a board which will have the requisite strength and density for such applications. For example, a board which is to be used on a roof deck should have sufficient strength to support bituminized felt roofing, asphalt and gravel or the like. Typically, such material would have to have a density between about 3 and 3½ lbs. per cubic foot. On the other hand, board which is to be used in a wall structure requires a density of only about 2 to 2½ lbs. per cubic foot. In both instances, however, the board must also be relatively resistant to abrasion and compression.

In order to protect foamed insulating boards against abrasion, it is a common practice to bond paper sheets, particularly Kraft paper sheets, to the opposite surfaces of the foamed insulation board. One technique of bonding paper to a foamed insulating board requires foaming the phenol aldehyde resin as a layer between a pair of spaced paper sheets. Mechanically, this is achieved by depositing the foam ingredients on one paper sheet and thereafter covering the deposited ingredients with a second paper sheet. Use of such paper sheets, however, adds to the cost of the board due not only to the cost of the paper itself but also to the cost of the handling thereof.

SUMMARY OF THE INVENTION

The present invention provides an insulating board of a foamed thermoset phenol aldehyde resin, particularly of a phenol formaldehyde resin, having an integral skin of non-cellular, non-friable thermoset resin. The integral skin renders the board resistant to abrasion and eliminates the need for bonded paper sheets on the board.

It has now been found that by foaming phenol-aldehyde resins between mold confining members which are coated with a sufficient amount of a surface active agent, the cells of the foam in contact with the mold confining members collapse and an integral skin of non-cellular thermoset resin forms on the opposite surfaces of the cured foamed layers. The skin is of sufficient thickness and density to protect the foamed board from abrasion and even indentation during use.

Thus, in one aspect of the present invention, there is provided a method of producing a foamed thermoset phenol aldehyde resin insulating board which comprises foaming an aqueous mixture of the ingredients necessary to form said foamed thermoset phenol aldehyde resin in contact with mold confining members to limit the thickness of the foamed and cured layer, the confining members being coated with a surface active agent in amounts sufficient to collapse the cells of the foam in contact with the mold confining members and to form a hard substantially non-friable, non-cellular skin of thermoset resin.

In another aspect of the invention, there is provided a foamed thermoset phenol aldehyde resin insulating board having a hard unfriable, unfoamed skin of said thermoset phenol aldehyde resin on opposite surfaces of the foam.

DETAILED DESCRIPTION

In the preferred method of practicing the present invention, a one-step resole is employed. The resole is a condensation product of a monohydric phenol and an aldehyde. It is particularly preferred to form the resole resin by condensing phenol, per se, as a 90 percent aqueous solution with formaldehyde as a 37 percent solution in the presence of an alkaline catalyst such as 30 percent aqueous sodium hydroxide. This curable phenol formaldehyde resin or resole resin sometimes is referred to as an A-stage reaction product and usually contains about 12 percent to about 15 percent by weight of water.

A surfactant preferably is employed in the practice of the present invention to reduce the surface tension of the resin, thereby aiding in the stabilization of the growth of the cells. The amount of surfactant normally employed ranges from about 0.5 percent to about 5 percent by weight of the liquid resin. Typical surface active agents that can be employed in the resole formulations include condensation products of alkaline oxides, such as ethylene oxide, with alkyl phenols, fatty acid and like materials. Commercially available fatty acid monoesters of polyethylene ethers such as commercial grades of polyethylene ether sorbitan monolaurate, polyethylene ether sorbitan monostearate and polyethylene ether sorbitan monooleate are useful as surfactants in the instant process.

The blowing agent employed in the instant invention includes vaporizable hydrocarbons such as normal paraffins, alcohols, ethers, fluorocarbons and the like. In the practice of the present invention, it is especially preferred to employ normal pentane as the blowing agent in an amount ranging from about 5 percent to about 10 percent by weight based on the weight of resin.

The acidic curing agent used in the instant process may be any strong acid compound which is conventionally used in curing phenolic foam, such as Lewis acids, hydrochloric acid, sulfuric acid, nitric acid, phosphoric acid, pyrophosphoric acid, polyphosphoric acid, phenol sulfonic acid, toluene sulfonic acid, metacresol sulfonic acid and resorcinol sulfonic acid. All such acids are used in the aqueous solution. An especially preferred acid curing agent is a 40 percent by weight powdered toluene sulfonic acid and 20 percent by weight sulfuric acid, the balance water. The acid catalyst is used in an amount ranging from about 8 percent to about 20 percent by weight and preferably about 15 percent by weight of the resin.

Boric acid may be incorporated in the formulation to enhance the fire retardant properties of the resultant foam. However, in order to prepare a foamed structure which will have the requisite density, compressive strength and fire retardant properties, boric anhydride should be incorporated in the foam formulation in an amount ranging from about 7.5 percent to about 20 percent by weight and preferably in an amount ranging from about 7.5 percent to about 10 percent by weight. The boric anhydride will react with the free water in the resin formulation during the foaming and curing and serve to generate considerable amount of heat to accelerate the foaming and curing reaction. The boric acid produced because of the hydrolysis reaction will also serve to enhance the fire retardant properties of the foam.

In the practice of the present invention, it is particularly desirable that a plasticizer be employed in the foam formulation. Preferably the plasticizer will be present in an amount ranging from about 10 percent to about 20 percent by weight of the resin and preferably at about 15 percent by weight of the resin. The plasticizers that are preferred in the practice of the instant invention include aromatic naphthalenic fractions of mineral oil, phthalate plasticizers such as dihexyl phthalate, diisooctyl phthalate and the like. The foregoing phthalate plasticizers are sold under the trade name "Jayflex" by Enjay Chemical Company, New York.

In order to control the rate of formation of the resin as well as the quality of the product formed upon forming, the resin is placed between mold confining members which will limit the thickness of the ultimate product produced. These confining members should be at temperatures such that when the resin is in contact with the mold members, the temperature of the resin will be maintained at about 100°C. For example, when boric anhdyride is used in the foam formulation in the amounts specified above, the mold confining members are maintained at about 60°C. to about 100°C. by external heating. This combination is sufficient to assure good uniform cell growth.

In order to be sure that the foamed product will have an integral skin sufficient to protect the foamed board against abrasion, the mold confining members are coated with a surface active agent in an amount sufficient that the cells of the foam in contact with the coated mold surfaces will collapse and form a dense substantially unfoamed skin on the surface of the phenol aldehyde resin.

The surface active agents that can be employed to coat the mold confining members include silicone oils and chlorinated waxes such as chlorinated paraffins, dimethyl polysiloxanes, copolymers of dimethyl siloxane and propylene oxide and the like. Many such surface active agents are known and readily available. The foregoing are mentioned as including particularly preferred materials that have a sufficiently high surface activity to cause the cells of the foaming and curing resin layer in contact with the coated surfaces of the mold to collapse and form the dense substantially unfoamed skin on the surface of the foamed resin.

The surface active agents must be coated on the surfaces of the mold confining members in contact with the foam in an amount sufficient to form a skin of thickness and density to provide the strength and hardness required in the board by conventional building standards. Suitably, the board will have an indentation hardness of at least 50, preferably at least 55 and more preferably at least 59 psi as determined by the ASTM test method C569 using a 10 lb. load. It is desirable that the board have a percentage recovery when subject to such a test of at least 25 percent and preferably at least 27 percent. It is known to coat mold parts with silicone substances as release agents in the preparation of molded resins such as for example disclosed in U.S. Pat. No. 3,341,646 and U.S. Pat. No. 3,468,911. However, in such applications the silicone material is only present as a release agent and the amount of such silicone substance is very small and insufficient to form a skin of the required thickness and density to provide the strength and hardness in the insulating board as in accordance with the present invention. Suitably, in accordance with the present invention, the surface active agent, particularly the silicone, is coated onto the surface of the mold confining members in an amount ranging from about 1 to 6 grams per square foot of foam. It is found that when the silicone is coated in the confining mold members in an amount less than 1 gram per square foot of foam, the skin formed is of insufficient thickness and hardness and has poor indentation resistance and recovery. On the other hand when the silicone is coated on the mold confining members in an amount above 6 grams per square foot of foam, the skin tends to become brittle. Preferably for optimum results the surface active agent is coated on the confining members in an amount ranging from about 2 to 4 grams of the surface active agent per square foot of surface area to be in contact with the foam. Such amounts produce a skin which is tough enough to resist physical damage without being brittle.

The present invention will be further illustrated by way of the following example.

EXAMPLE

A phenol formaldehyde resin (resole resin) was produced in a hundred gallon vessel equipped for distillation by condensing the phenol and formaldehyde in the presence of an alkaline catalyst. The resole resin was metered to a high intensity, higher shear mixer along with the following materials, all weights based on 100 parts by weight of resin: 10 parts by weight of normal pentane as blowing agent; 12 parts by weight of mixture of 20 percent sulfuric acid, 40 percent by weight toluene sulfonic acid and 40 percent by weight water as acid curing agent; five parts by weight of ethoxylated nonyl phenol surfactant; 15 parts by weight of aromatic naphthalenic fraction of mineral oils as plasticizer; 15 parts by weight of boric anhydride. The resultant mix was deposited onto a mold confining member coated with silicone oil in the amount specified in the following Table I. A top mold member coated with the same amount of silicone oil was placed over the foam. In this way the thickness of the foam was limited. The mold member was maintained at temperatures about 60° C. The resultant foam board obtained had, on each side thereof, an outer skin of substantially unfoamed, noncellular phenol formaldehyde resin, and the skin had an indentation hardness and percentage recovery as set forth in Table I.

TABLE I

| Grams/sq. Foot | Indentation hardness psi | Recovery, % |
| --- | --- | --- |
| 8 | 40 | 20 |
| 4 | 61 | 27 |
| 2.66 | 59 | 29.6 |
| 0.66 | 35 | 14.4 |

As can be seen from Table I that the range 2.66 to 4 grams per square foot of silicone oil provided the best results with respect to the indentation hardness and percentage recovery.

What is claimed is:

1. In the method of producing a foamed thermoset phenol aldehyde resin element by foaming a mixture of thermoset phenol aldehyde resin, and during foaming and curing, maintaining the resin between mold confining members to limit the thickness of the foam and cured element, the improvement comprising coating the surface of the mold confining members with a surface active agent in an amount ranging from 1 to 6 grams per square foot of mold surface area in contact with the foam whereby the foam in contact with the mold members collapses, thereby forming a hard non-friable skin of thermoset resin on the foam.

2. The method of claim 1 wherein the surface active agent is silicone oil.

3. The method of claim 1 wherein the surface active agent is a chlorinated wax.

4. The method of claim 1 wherein the surface active agent is present in an amount from 2 to 4 grams per square foot of mold surface area in contact with the foam.

5. The method of claim 1 wherein the phenol aldehyde resin is a phenol formaldehyde resin.

6. The method of claim 1 wherein the mold confining members are maintained at temperatures in the range of about 60°C. to about 100°C. during foaming and curing of the resin.

* * * * *